United States Patent
Baumgartner et al.

(10) Patent No.: US 7,673,724 B2
(45) Date of Patent: Mar. 9, 2010

(54) BRAKE MECHANISM

(75) Inventors: Johann Baumgartner, Moosburg (DE); Stefan Sagerer, Oberappersdorf bei Zolling (DE); Uwe Mauz, Esslingen (DE)

(73) Assignees: KNORR-BREMSE Systeme fuer Nutzfehrzeuge GmbH, Munich (DE); DaimlerChrysler AG, Stuttgart (DE)

( * ) Notice: Subject to any disclaimer, the term of this patent is extended or adjusted under 35 U.S.C. 154(b) by 324 days.

(21) Appl. No.: 11/597,919

(22) PCT Filed: Mar. 24, 2005

(86) PCT No.: PCT/EP2005/003155
§ 371 (c)(1),
(2), (4) Date: Jul. 25, 2007

(87) PCT Pub. No.: WO2005/095815
PCT Pub. Date: Oct. 13, 2005

(65) Prior Publication Data
US 2007/0284201 A1    Dec. 13, 2007

(30) Foreign Application Priority Data
Apr. 1, 2004    (DE) ................ 10 2004 016 826

(51) Int. Cl.
*F16D 55/00* (2006.01)
(52) U.S. Cl. ................ 188/73.31; 188/71.1; 188/73.45
(58) Field of Classification Search ................ 188/71.1, 188/73.31, 73.45, 73.1, 73.2, 73.39, 73.42, 188/73.43, 73.46
See application file for complete search history.

(56) References Cited

U.S. PATENT DOCUMENTS

| 3,613,836 | A | * | 10/1971 | Dowell | 188/71.1 |
| 3,999,635 | A | | 12/1976 | Hotchkiss | |
| 4,046,231 | A | | 9/1977 | Ohori et al. | |
| 4,311,216 | A | * | 1/1982 | Garrett et al. | 188/18 A |
| 4,352,414 | A | * | 10/1982 | Scott | 188/73.34 |
| 4,461,372 | A | * | 7/1984 | Bekkala et al. | 188/73.34 |
| 4,613,019 | A | * | 9/1986 | Giorgetti | 188/73.31 |
| 6,032,768 | A | | 3/2000 | Ebbinghaus | |
| 6,408,991 | B1 | | 6/2002 | Herffurth et al. | |

FOREIGN PATENT DOCUMENTS

| DE | 198 55 275 A1 | 6/2000 |
| DE | 200 21 587 U1 | 5/2001 |
| DE | 102 60 829 A1 | 7/2003 |

(Continued)

OTHER PUBLICATIONS

International Search Report dated Jul. 6, 2005 including an English translation of the pertinent portions (Six (6) pages).

*Primary Examiner*—Xuan Lan Nguyen
(74) *Attorney, Agent, or Firm*—Crowell & Moring LLP

(57) ABSTRACT

A brake mechanism includes a connecting element that is fixed to a wheel axle of a motor vehicle or is embodied monolithically therewith, and a fastening flange of a disk brake caliper. The fastening flange is fixed to the connecting element. The brake mechanism is configured in such a way that the fastening flange is retained in a positive manner on the connecting element in the circumferential direction of the wheel axle.

13 Claims, 1 Drawing Sheet

FOREIGN PATENT DOCUMENTS

| | | |
|---|---|---|
| EP | 0 849 486 A2 | 6/1998 |
| FR | 1.313.957 A | 1/1963 |
| JP | 7-12148 A | 1/1995 |
| JP | 10-331878 A | 12/1998 |
| JP | 2001-271857 A | 10/2001 |
| JP | 2001-280377 A | 10/2001 |

* cited by examiner

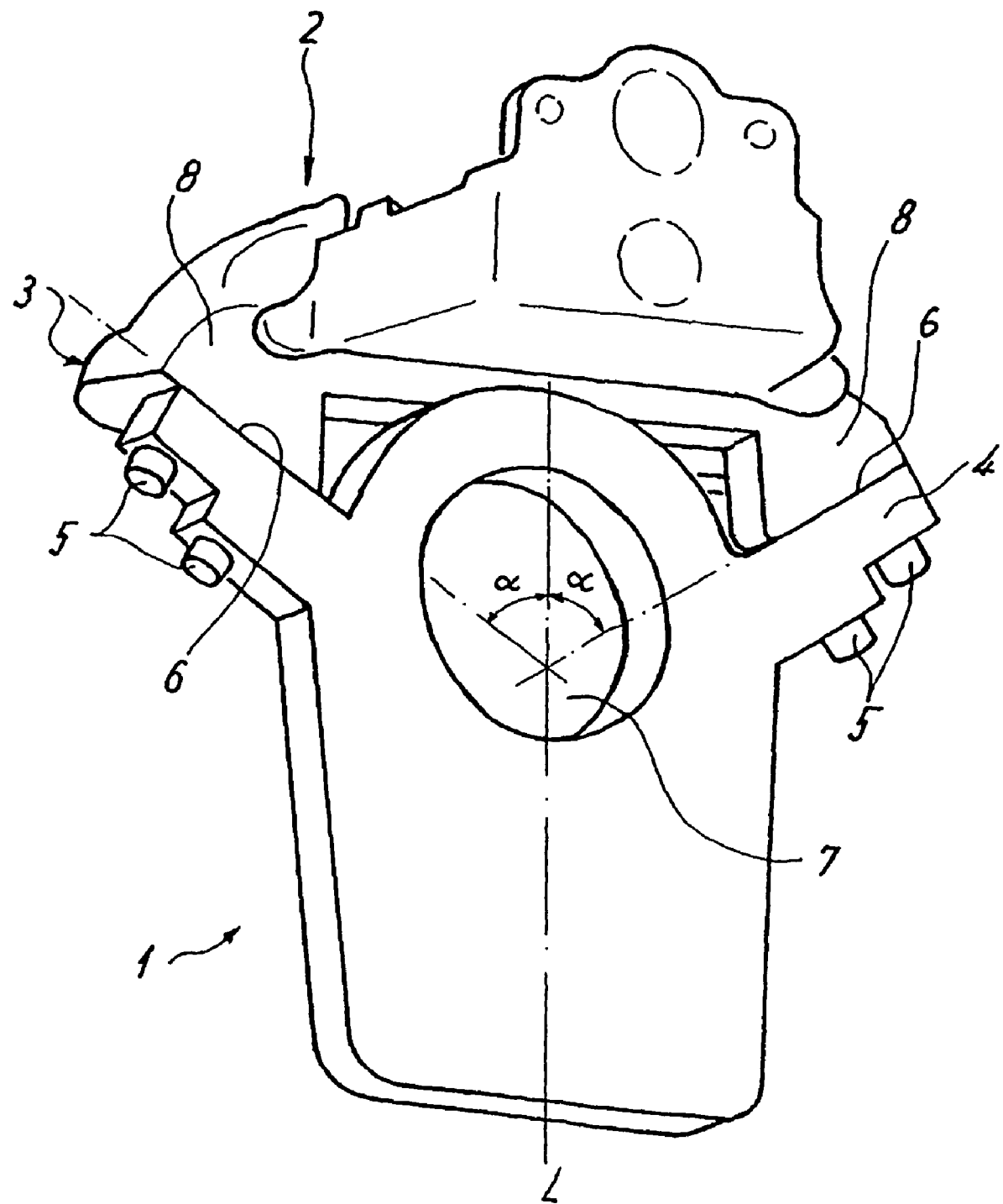

BRAKE MECHANISM

BACKGROUND AND SUMMARY OF THE INVENTION

The present invention relates to a brake mechanism.

Preferably disk brakes which are actuated by compressed air, in particular for commercial vehicles, are fastened in each case to a connecting element which is connected fixedly to the wheel axle by a fastening flange of the brake caliper or a brake carrier of the disk brake being screwed to the connecting element.

This type of fastening is shown and described, for example, in EP 0 849 486 A2. Here, the connecting element and the fastening flange of the brake caliper bear with their full surface area against one another, that is to say in an overlapping manner, and are screwed to one another by screws which extend in the axial direction of the wheel axle.

Although satisfactory positioning of the brake caliper is achieved as a result, the exclusively force-transmitting connection is associated with some disadvantages which stand in the way of long-term optimum operation of the disk brake.

During the braking operation, a torque becomes active as a result of the applied braking force or as a result of the friction forces which act on the brake disk, which torque has to be absorbed by the screw connections which in each case comprise a through hole, a threaded hole and a screw, it being possible for the through hole to be provided in the connecting element or fastening flange and for the threaded hole to be provided in the other associated component.

In order for the screw to pass through, the diameter of the through whole has to be greater than the shaft diameter of the screw. In particular in the case of high braking moments which are not transmitted by the force-transmitting connection, this leads to a relative movement of the component which has the through hole with respect to the other components, until the interior of the through hole comes into contact with the screw shaft. As a result, the screws are subjected to shear forces to a considerable extent, which makes corresponding cross-sectional dimensioning necessary which counteracts inexpensive mounting and a weight-optimized construction.

It is also problematic that this type of connection requires a relatively large number of connection screws, which necessitates large bearing faces of the connecting element and the fastening flange.

As a result of the abovementioned relative displacement of the components which are connected to one another during braking, the sliding guide of the brake caliper in a sliding caliper brake can be stressed, which leads to long-term damage of the guide parts. Moreover, in the case of reversing operation, the frequent to and fro displacement of the components can lead to loosening of the screws, as a result of which the operational security can be impaired overall.

One further disadvantage of the known fastening type is the poor accessibility of the screws; as screwing has to take place from the vehicle inner side, mounting and dismantling of the brake is made difficult.

It is known from DE 200 21 587 U1 not to arrange the screws coaxially with respect to the rotational axis of the disk brake, but tangentially with respect thereto. Although this construction makes improved accessibility of the screws possible during mounting and a reduction in the brake weight as a result of the possible smaller bearing faces of the connecting element and the fastening flange, the relative displaceability of the two components with respect to one another during the transmission of the braking moments to the axle still exists, with the above-described disadvantages.

The present invention is therefore based on the object of developing a brake mechanism of the generic type in such a way that it can be manufactured and mounted or dismantled inexpensively, weight reduction of the brake overall is achieved and the operational security is improved.

This object is achieved by a brake mechanism having a connecting element which is fastened to a wheel axle of a motor vehicle or is configured in one piece with the latter, and a fastening flange of a brake caliper or a brake carrier of a disk brake, the fastening flange being fastened to the connecting element, wherein the fastening flange is held in a form-fitting manner on the connecting element in the circumferential direction of the wheel axle.

As a result of this structural configuration, the braking moment is now absorbed by a form-fitting connection and not, as in the prior art, by a force-transmitting connection. Relative displacement of the fastening flange with respect to the connecting element is therefore precluded.

This results first of all in an improvement in the operational security, as, for example in the case of a sliding caliper brake, the guide parts can no longer be stressed with respect to one another and, during reversing operation, loosening of connection screws is precluded.

As they no longer serve to accommodate the screws, but exclusively for the form-fitting connection, the contact faces of the two components can be kept relatively small, which contributes to a weight saving and to the optimization of manufacturing. The same is true analogously for the reduced number of connections screws which is then possible, as these in practice serve only to hold the two components against one another.

The associated reduction in the space requirement makes substantially improved accessibility to the screws possible, with the result that mounting and dismantling of the brake is possible in a substantially simpler manner.

According to one advantageous development of the invention, there is provision for the contact faces of the fastening flange on one side and of the connecting element on the other side to extend in a manner which is oriented obliquely toward the center of the wheel axle, with the result that the respective two contact faces lie in a V shape with respect to one another. Here, the fastening flange in practice forms a wedge which is supported laterally on the connecting elements.

During brake mounting, this V shape makes simple, predefined positioning possible, which likewise simplifies mounting.

Further advantageous refinements of the invention are described and claimed herein.

BRIEF DESCRIPTION OF THE DRAWING

In the following text, one exemplary embodiment of the invention will be described using the appended drawing.

The single FIGURE shows a brake mechanism according to the invention in a perspective illustration.

DETAILED DESCRIPTION OF THE DRAWING

The FIGURE shows a brake mechanism which, in its basic construction, comprises a connecting element 1, a fastening flange 3 and a brake caliper 2 which is formed here in one piece with the latter.

The connecting element 1 is fastened to a wheel axle (not shown), for example by welding, for which purpose the connecting element 1 has a push-in bore 7, in order to accommodate the wheel axle. In one design variant, the connecting element 1 can be configured in one piece with the axle body as a cast part or forging.

Overall, the connecting element 1 is of plate-shaped and, here, mirror-symmetrical configuration. Connecting limbs 4 are formed on both sides, which lie in a V shape with respect to one another and have contact faces 6, against which fastening limbs 8 of the fastening flange 3 bear. Accordingly, the fastening limbs 8 likewise together form a V shape, in relation to the faces which face the contact faces 6. The V has an opening angle $\alpha$ with respect to the center longitudinal axis L of the connecting element. The center longitudinal axis L extends through the tip of the V.

In principle, every angle which is less than 90° is conceivable, below which the respective contact face 6 is oriented toward the center longitudinal axis of the connecting element 1. The contact faces 6 preferably lie in each case at an angle $2a$ of from 10 to 80° with respect to one another, preferably from 30 to 60°, in particular approximately 55°, with very particular preference 58°, as results which are improved further can be achieved in each case in a surprising manner at these angles.

The fastening limbs 8 and therefore the brake caliper 2 are connected to the connecting element 1 by connection screws 5 which extend preferably tangentially with respect to the wheel axle or with respect to the push-in bore 7, the heads of the connection screws 5 being supported on supporting faces of the connecting limbs 4, which supporting faces extend parallel with respect to the respective contact face 6.

As can be seen clearly, the connecting limbs 4 form an abutment for absorbing braking moments which occur and are active in the circumferential direction of the push-in bore 7 or the wheel axle (not shown). Shear loading of the connection screws 5 is precluded here.

TABLE OF REFERENCE NUMBERS

1 Connecting element
2 Brake caliper
3 Fastening flange
4 Connecting limb
5 Connection screw
6 Contact face
7 Push-in bore
8 Fastening limb

The invention claimed is:

1. A brake mechanism, comprising:
    a connecting element operatively adapted for being fastenable to a wheel axle of a motor vehicle or being configured in one-piece with the wheel axle;
    a fastening flange of at least one of a brake caliper and brake carrier of a disk brake, the fastening flange being fastened fixedly to the connecting element;
    wherein the fastening flange is adaptively configured to be held in a form-fitting manner on the connecting element in a circumferential direction of the wheel axle;
    wherein the fastening flange and the connecting element have, in each case, contact faces which bear against one another and extend, in each case, at an acute angle $\alpha$ of less than 90° with respect to a center longitudinal axis of the connecting element; and
    wherein the contact faces are arranged so as to extend in a V shape with respect to one another.

2. The brake mechanism as claimed in claim 1, wherein the contact faces are arranged in a mirror-symmetrical manner about the center longitudinal axis of the connecting element with respect to one another.

3. The brake mechanism as claimed in claim 1, wherein the connecting element has two connecting limbs, the sides of which face the fastening flange form, in each case, the contact face.

4. The brake mechanism as claimed in claim 1, wherein the contact faces enclose an angle $2\alpha$ of less than 90° with respect to the center longitudinal axis of the connecting element.

5. The brake mechanism as claimed in claim 1, wherein the contact faces enclose an angle $2\alpha$ of between 20° and 70° with respect to the center longitudinal axis of the connecting element.

6. The brake mechanism as claimed in claim 1, wherein the contact faces enclose an angle $2\alpha$ of between 30° and 60° with respect to the center longitudinal axis of the connecting element.

7. The brake mechanism as claimed in claim 1, wherein the contact faces enclose an angle $2\alpha$ of approximately 55°.

8. The brake mechanism as claimed in claim 1, wherein the contact faces enclose an angle $2\alpha$ of approximately 58°.

9. The brake mechanism as claimed in claim 1, wherein the connecting element is formed in one piece as a cast part with the wheel axle or with an axle element.

10. A brake mechanism comprising:
    a connecting element operatively adapted for being fastenable to a wheel axle of a motor vehicle or being configured in one-piece with the wheel axle;
    a fastening flange of at least one of a brake caliper and brake carrier of a disk brake, the fastening flange being fastened to the connecting element;
    wherein the fastening flange is adaptively configured to be held in a form-fitting manner on the connecting element in a circumferential direction of the wheel axle,
        wherein the fastening flange and the connecting element have, in each case, contact faces which hear against one another and extend, in each case, at an acute angle $\alpha$ of less than 90° with respect to a center longitudinal axis of the connecting element,
        wherein the connecting element has two connecting limbs, the sides of which face the fastening flange form, in each case, the contact face, and
        wherein each connecting limb has supporting faces which extend parallel with respect to the associated contact face and on which heads of connection screws are supported, which connection screws are screwed into the fastening flange.

11. The brake mechanism as claimed in claim 10, wherein the connection screws are arranged so as to extend tangentially with respect to the wheel axle.

12. The brake mechanism as claimed in claim 10, wherein the fastening flange is provided with two fastening limbs, of which each is assigned to a connecting limb of the connecting element and bears against the contact face.

13. The brake mechanism as claimed in claim 12, wherein each fastening limb bears over its full contact face against the contact face of the associated connecting limb.

* * * * *

UNITED STATES PATENT AND TRADEMARK OFFICE
CERTIFICATE OF CORRECTION

PATENT NO. : 7,673,724 B2  Page 1 of 1
APPLICATION NO. : 11/597919
DATED : March 9, 2010
INVENTOR(S) : Johann Baumgartner et al.

It is certified that error appears in the above-identified patent and that said Letters Patent is hereby corrected as shown below:

On the Title Pg Item (73), please correct the Assignee's name as follows:

[[KNORR-BREMSE Systeme fuer Nutzfehrzeuge GmbH]] to --KNORR-BREMSE Systeme fuer Nutzfahrzeuge GmbH--.

Signed and Sealed this

First Day of June, 2010

David J. Kappos
*Director of the United States Patent and Trademark Office*